Figure 1:
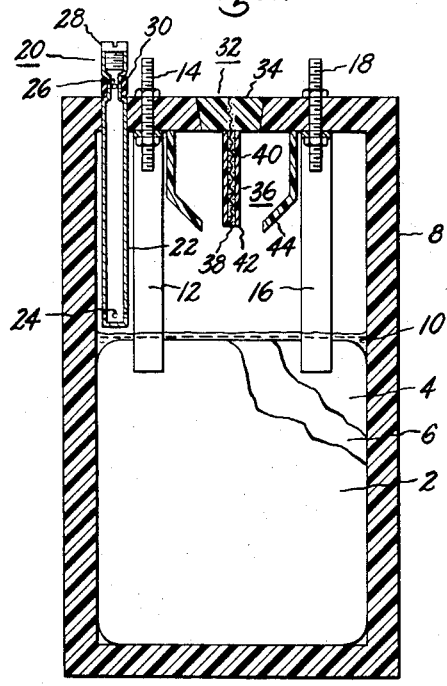

Dec. 5, 1967 W. N. CARSON, JR 3,356,533
SECONDARY CELL HAVING HYDROGEN-OXYGEN RECOMBINATION
CATALYST IN COMMUNICATION
WITH ELECTROLYTE CHAMBER
Filed Jan. 7, 1965

Inventor:
William N. Carson, Jr.,
by Paul A. Frank
His Attorney.

United States Patent Office 3,356,533
Patented Dec. 5, 1967

3,356,533
SECONDARY CELL HAVING HYDROGEN-OXYGEN RECOMBINATION CATALYST IN COMMUNICATION WITH ELECTROLYTE CHAMBER
William N. Carson, Jr., Schenectady, N.Y., assignor to General Electric Company, a corporation of New York
Filed Jan. 7, 1965, Ser. No. 423,970
17 Claims. (Cl. 136—6)

This invention relates to an improvement in aqueous electrolyte secondary cells. More particularly, the invention relates to cells protected from overpressurization by a hydrogen-oxygen recombination catalyst lying in communication with or within the electrolyte chamber.

Aqueous electrolyte secondary cells have enjoyed wide utilization, since the reversible character of the electrode reactions permits repeated charge and discharge of the cells. Certain disadvantages with such cells have been experienced, however, through the inadvertent inducement of irreversible reactions within the cells. While the cells may be constructed of a variety of materials, all forms are subject to overcharge and overdischarge which result in electrolysis of the water from the electrolyte and evolution of gas within the cell. Undesirable gaseous cell products may also result in certain instances from impurities or contaminants within the cells or in the employment of high currents in charging or discharging which alter the mechanism of one or more of the half-cell reactions.

Various approaches have been taken in dealing with gaseous products generated by secondary cells. Perhaps, the simplest approach has been to design cells without provision for gas evolution. Such cells are restricted in use to circuits in which the opportunity for overcharge or overdischarge is slight. Even so, such cells have been employed principally only in small sizes since inadvertent abuse may result in explosion of the cell. Strengthening of the cell casing has not proven attractive since it has been estimated that pressures of $10^{15}$ atmospheres can be generated using an electrolysis voltage of only 1.60 volts per cell.

An alternate approach has been to provide vented cells. While such cells are generally free of explosion hazards, they are subject to failure due to electrolysis or evaporation of the water component of the electrolyte or due to inactivation of the electrode through exposure to the atmosphere while the electrolyte is at a low level. Such cells require periodic maintenance, and leakage of electrolyte through the vent precludes tilting or inversion. Pressure vented cells have exhibited wide popularity but they carry over to some extent the disadvantages of sealed cells and vented cells as well as requiring an additional expense in the form of the pressure vent mechanism.

In certain cells a chemical approach to dealing with gaseous products of electrolysis has been pursued. While such approaches have been successful in eliminating a portion of the gaseous cell products, complete elimination of the over-pressurization problem has not been achieved. As an example, in a nickel-cadmium cell in which the reactions at the positive and negative electrodes respectively proceed as follows:

(+) $2Ni(OH)_2 + 2OH^- \rightleftharpoons 2NiOOH + 2H_2O + 2e$
(−) $Cd(OH)_2 + 2e \rightleftharpoons Cd + 2OH^-$ where the arrow to the right indicates the direction of charge and the arrow to the left indicates the direction of discharge, it has become a wide spread practice to design the negative electrode with a greater capacity than the positive electrode. Accordingly, upon overcharge of the cell, electrolysis takes place first at the positive electrode according to the following formula:

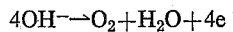

The oxygen gas generated may be disposed of through two separate types of reactions occurring at the negative electrode

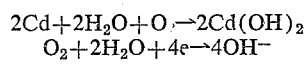

While the problem of overcharge is thereby minimized, the problem of overdischarge remains as indicated by the following reaction at the positive electrode:

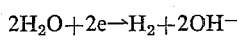

Accordingly, nickel-cadmium cells remain subject to the over-pressurization considerations described.

It is an object of the invention to provide an aqueous electrolyte secondary cell capable of overcharge and overdischarge without over-pressurization or loss of electrolyte.

It is an additional object to provide a sealed aqueous electrolyte secondary cell capable of being tilted or inverted without loss of electrolyte.

It is a further object to provide means attachable to conventional secondary cells to prevent overpressurization without venting.

These and other objects of my invention are accomplished by providing a hydrogen-oxygen recombination catalyst lying within or in communication with the electrolyte chamber of an aqueous electrolyte secondary cell. The catalyst is protected from reduced effectiveness due to wetting, i.e., drowning, by the inclusion of a wet-proofing agent in association therewith.

Figure 3:
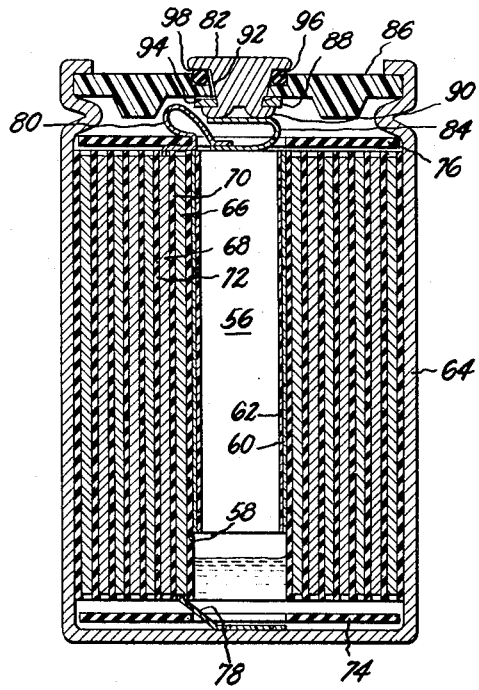
Figure 2:
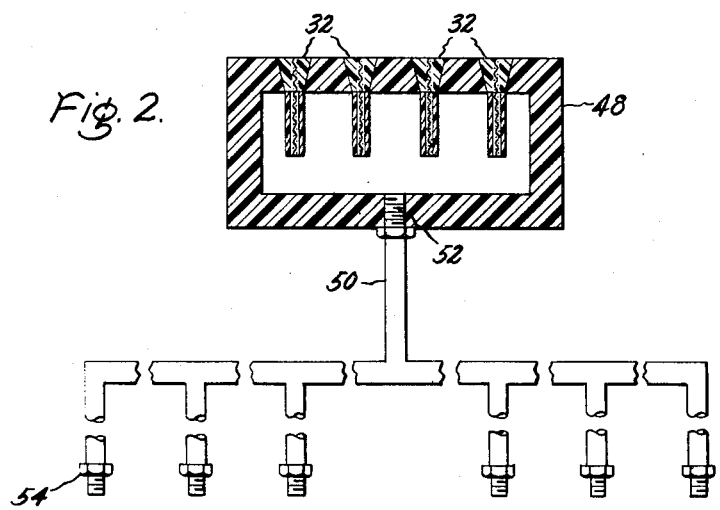

My invention may be better understood by reference to the following description considered in conjunction with the drawings in which:

FIGURE 1 is a vertical section of a secondary cell;
FIGURE 2 is an elevation, partly in section, of a catalyst plenum and a cell connection means; and
FIGURE 3 is a vertical section of an alternate form of a secondary cell.

My invention is applicable to all cells which generate hydrogen and oxygen under the conditions of use. My invention is particularly useful with aqueous electrolyte secondary cells including, for example, lead-acid cells such as those having a lead anode, a sulfuric acid electrolyte, and a lead oxide cathode; nickel-iron cells such as those having an iron anode, a potassium hydroxide electrolyte, and a nickelous hydroxide and nickel oxide cathode; nickel-cadmium cells such as those having a cadmium cathode, a potassium hydroxide electrolyte, and a nickelous hydroxide and nickel oxide cathode; zinc-silver cells such as those having a zinc anode, a potassium hydioxide electrolyte, and a silver oxide cathode; cadmium-silver cells such as those having a cadmium anode, a potassium hydroxide electrolyte, and a silver oxide cathode; lead-silver cells such as those having a lead anode, a potassium hydroxide electrolyte, and a silver oxide cathode; cadmium-mercuric oxide cells such as those having a cadmium anode, a potassium hydroxide electrolyte, and a mercuric oxide cathode; and other similar cells.

Suitable cell catalysts include all materials capable of spontaneously recombining hydrogen and oxygen. Preferred materials include Group VIII metals of the light and heavy platinum triads, which are ruthenium, rhodium, palladium, osmium, iridium, and platinum. While such materials may be employed as metallic bodies, it is generally preferred to employ the catalyst in a form having a high ratio of surface area to weight, such as blacks, for example.

The catalyst is mounted within the cell electrolyte chamber or in gaseous communication with the electrolyte chamber such that oxygen and hydrogen evolved from the cell electrolyte may be recombined. If desired, the catalyst may form a part of the cell casing or be mounted on the interior of the cell casing such that the inner surface thereof is in contact with hydrogen and oxygen. A more preferred arrangement consists of supporting the catalyst from the casing such that it extends into the electrolyte chamber and hence provides a larger exposed surface per unit weight.

While the catalyst may be employed alone in either metallic or finely divided form, it is additionally contemplated that the catalyst be mounted on a supporting element. Suitable supporting elements include woven and unitary screens formed of noncorrosive materials such as nickel, stainless steel, titanium-palladium alloy, etc.; porous ceramic pellets and matrices formed of inert metallic oxides such as alumina; and carbon or graphite structures having catalyst reduced in situ as, for example, by evaporating the water from a structure impregnated with an aqueous solution of platinum or palladium chloride or chloro-platinic acid and subsequently decomposing the catalyst compound by the use of heat. Additionally, when an acid electrolyte is used, the supporting element may be glass while supporting elements finding utility with basic electrolytes include magnesia, silicon carbide, epoxies, fluorinated polymers, etc.

The catalyst is mounted in the cell so as to be electrically insulated from the cell electrodes either internally, as for example, through physical contact with one or more of the cell plates, or externally, as for example, through external circuitry or a conductive cell casing linkage. The term "electrically insulated" is employed in the narrow sense of freedom from an electron conducting path only, since electrolyte splashing and cell tilting or inversion in use may provide an ionic conducting path between the catalyst and one or more of the cell electrodes.

It is generally preferred that the catalyst be mounted within the aqueous electrolyte chamber so as to have minimal direct contact with the electrolyte, since wetting of the catalyst reduces its effectiveness. Generally, it is preferred that the catalyst be mounted adjacent what constitutes the upper wall of the cell casing during use. Supplementary protection may be provided to the catalyst against electrolyte splashing by suitable baffling mounted within the cell casing. In certain applications it may be desirable to mount the catalyst in a separate plenum removed from the electrolyte chamber but in gaseous communication therewith. Such arrangement not only provides additional protection against catalyst wetting but also provides additional protection to such cells as may be prone to contamination by small amounts of catalyst as, for example, lead-acid cells.

Inasmuch as the catalyst is subject to drowning not only by the aqueous electrolyte within the cell but also by the hydrogen and oxygen recombined on the catalyst surface, it is preferred that the catalyst be protected with a wet-proofing agent. Suitable wet-proofing agents include polymeric materials having a critical surface tension less than the surface tension of water and preferably less than 32 dynes/cm. Critical surface tension is defined as the value of the liquid surface tension at which liquids spread on a given polymer surface. A full discussion of critical surface tension is provided at page 240, "Surface Chemistry Theory and Industrial Application," by Lloyd I. Osipow, Reinhold Publishing Corporation, New York (1962). The wet-proofing agent is employed as a film on the exterior surface of the catalyst structure. Generally, films of from 0.7 to 2.0 milligrams per square centimeter have been found effective. When the catalyst is employed in a particulate form as, for example, a black, it is necessary that a binder be employed with the catalyst. In the case of a black, the binder may range from 5 to 25 percent by weight, based on the weight of the mixture. While various materials chemically resistant to degradation by the catalyst in the cell environment may be employed as binders, it is generally preferred that the binder additionally possess wet-proofing properties. Fluorinated polymers and particularly polychlorotrifluoroethylene and polytetrafluoroethylene represent preferred materials exhibiting utility both as binders and as wet-proofing agents.

The procedure for incorporating wet-proofing and binding agents such as fluorinated polymers, for example, into finely divided catalysts is well understood by those skilled in the art. As a first step, a finely divided catalyst is mixed with a dry, particulate polymeric wet-proofing agent such as polytetrafluoroethylene (hereinafter, PTFE), for example, or with an aqueous dispersion of the wet-proofing agent. If desired, a particulate, noncorrosive metal diluent may be included such as nickel, silver, etc. The proportion of the metal diluent is not critical. The proportion of water in the aqueous dispersion is not critical, although it is preferred that the minimum amount of water be incorporated that will render the mixture pasty and easily workable. The pasty or particulate mixture of PTFE and catalyst may be spread on any suitable supporting structure as, for example, a noncorrosive metal screen or, if a self-supporting structure is desired, on a casting surface. The mixture may be additionally shaped by molding rolling, pressing, etc. In the case of a PTFE wet-proofing agent, the wet-proofed catalytic structure is prepared by first elevating the temperature above the evaporation temperature of water and, after drying, sintering the structure at elevated temperatures and/or pressures. The sintering time, temperature, and pressure are interrelated variables. Increase of either pressure, temperature, or sintering time will generally permit a proportionate decrease of the remaining two factors. Accordingly, sintering conditions may vary widely. It has been found that pressures as high as 5000 p.s.i. are operable as well as temperatures of 400° C. On the other hand, it is not necessary that elevated pressures be employed in sintering and temperatures as low as 190° C. have proven effective. Sintering at excessively high temperatures and pressures is generally undesirable, since the surface area per unit weight of the catalyst may be reduced. Further, temperatures above 400° C. may degrade the PTFE. It is appreciated, however, that sintering for extremely short periods as, for example, less than 30 seconds at high temperature-pressure extremes, may not adversely affect the properties of the catalyst structure formed. Generally, sintering periods ranging from 30 seconds to 10 minutes have been employed successfully at between 300° C. and 350° C., whereas sintering periods of up to 6 hours may be employed at 250° C.

External wet-proofing layers of required thickness may be applied to catalytic structures by any one of several conventional coating techniques. According to one procedure, an aqueous polymer dispersion is applied to a transfer surface such as aluminum foil, for example. Upon evaporation of the aqueous component, the wet-proofing agent is transferred to the external surface of the catalytic stucture. While neither heat nor pressure are essential to the transfer, it is preferred that the wet-proofing agent be subjected to temperatures in the range of 190° C. to 400° C. and pressures up to 5000 p.s.i. in the case of PTFE in order to secure firm bonding of the wet-proofing agent and the catalytic structure. The transfer surface may be physically stripped from the wet-proofing agent or, in the case of aluminum foil, the transfer surface may be chemically stripped employing first an alkali hydroxide followed by rinsing with a dilute acid and/or distilled water. In an alternate technique of applying an external wet-proofing layer to a catalyst structure, the structure is moved beneath an atomizing nozzle delivering an aqueous dispersion of wet-proofing agent until the desired film thickness is attained. Subsequently, the aqueous component is removed by evaporation and, in the case of PTFE, sintering is conducted within the temperature range of 190° C. to 400° C. Suitable aqueous PTFE dispersions for employment with either of the coating techniques outlined above are formed by diluting aqueous PTFE, available under the trademark "Teflon-30," with from 1 to 9 parts water.

When the catalyst structure is employed in the electrolyte chamber, it is necessary that the wet-proofing layer be applied to both sides of the structure. When, however, the catalyst is employed in an external plenum remote from the catalyst chamber, a wet-proofing layer on both sides of the catalyst structure is not necessary. It may be desired to form the catalyst structure in a bulk operation and later subdivide the bulk into a plurality of elements. In such case, it is unnecessary to later apply a wet-proofing layer to the edges of the subdivided catalyst structure, since the additional surface presented by the exposed edges is negligible as compared with the surface area of the sides of the catalyst structure.

My invention may be better understood by reference to the secondary cell shown in FIGURE 1 in which positive and negative cell plates 2 and 4, respectively, have a conventional electrolyte permeable separator 6 interposed therebetween. The plates are mounted in an insulative casing 8 which confines an aqueous electrolyte 10. An electrical connector 12 extends from the plate 2 to the positive terminal 14 while a connector 16 extends from plate 4 to negative terminal 18.

As an optional element, a conventional pressure-vent assembly 20 is mounted by the casing 8. The pressure-vent assembly consists of a cylindrical tube 22 having a plurality of apertures 24 lying within the cell casing and a plurality of apertures 26 lying exterior of the cell casing. The upper end of the tube is sealed by a removable cap 28 while the apertures 26 are sealed with an expansible resilient O-ring 30.

A catalyst assembly 32 is shown mounted in the upper wall of the cell casing 8. The assembly is comprised of a plug portion 34 sealed to the casing and supporting a catalyst structure 36. The catalyst structure is in turn comprised of a central supporting screen 38 having a layer of blended catalyst and wet-proofing agent 40 lying adjacent each face thereof. The exterior portion of the catalyst structure is formed of thin layers 42 of wet-proofing agent. The catalyst structure is further protected from wetting by baffles 44 mounted on either side thereof.

In certain instances, it may be desirable to apply the invention to vented or pressure-vented cells of conventional construction. Further, in certain types of cells, such as lead-acid cells, which may be contaminated by small amounts of catalyst, it may be desirable to mount the catalyst structure remote from the electrolyte chamber. In FIGURE 2, a catalyst plenum 48 is shown having a plurality of catalyst assemblies 32 sealingly mounted therein. The plenum is connected to a gas conduit manifold 50 at outlet 52. A plurality of cell connectors 54 is shown.

To further illustrate the invention, an alternate cell construction is shown in FIGURE 3. A catalyst assembly 56 consisting of an insulative mandrel 58 having a layer of catalyst 60 on the interior surface thereof, which is in turn covered with a wet-proofing layer 62, is centrally positioned within a metal casing 64. Spirally wound about the exterior of mandrel 58 are negative and positive plates 66 and 68, respectively, which are electrically insulated by interposed separators 70 and 72. Shorting of the positive plates against the metal casing 64 is prevented by insulating gaskets 74 and 76 lying below and above the spirally wound plates. An electrical connection 78 connects the negative plate 66 to the cell casing. A lead 80 extending upwardly from the positive plate 68 connects to positive terminal 82 through a resilient strip 84. The positive terminal 82 is mounted in an insulative cell cover 86 held in position by the crimped upper edge of casing 64. A washer 88 cooperating with an outwardly toed portion 90 of the terminal 82 holds the terminal locked in the cover 86. V-grooves 92 and 94 in the terminal and the washer respectively allow gas to escape from the interior of the cell. An O-ring 96 mounted beneath an annular shoulder 98 on the terminal prevents gas from being vented from the cell until a desired pressure level therewithin.

While the specific embodiments shown in FIGURES 1 to 3 inclusive are illustrative of three disparate forms of the invention, it is apparent that the embodiments disclosed are illustrative only and not definitive of the invention. Numerous modifications will be obvious to those skilled in the art. The use of a pressure-vent or a vent of any type in the cells is not essential. Alternatively, other conventional types of pressure-vents may be employed, if desired. The baffles may be altered in form or eliminated entirely from the cell. While a flat plate cell and spirally wound plate cell have been shown, the catalyst structure may be employed in any conventional aqueous electrolyte secondary cell and with any desired number of plates per cell. Further, while the invention has been described with respect to cells, the invention is equally applicable to batteries.

The catalyst plenum shown in FIGURE 2 may be formed with a conduit extending to any desired number of cells or batteries including a single cell. It is additionally contemplated that the plenum may be formed integrally with a cell or battery casing and with at least one wall in common therewith.

In operation of cells constructed in accordance with the invention, the problems of over-pressurization and/or venting associated with the electrolysis of water upon overdischarge or overcharge can be avoided. For purposes of illustration, if the cell of FIGURE 1 is considered a nickel-cadmium cell having an equal positive and negative plate capacity, electrolysis at the positive and negative electrodes upon overcharge proceed as follows:

(+)  $4OH^- \rightarrow O_2 + 2H_2O + 4e$ (−)  $4H_2O + 4e \rightarrow 2H_2 + 4OH^-$ The hydrogen and oxygen formed separates from the liquid electrolyte and migrates to the upper portion of the electrolyte chamber into contact with the catalyst structure. Inasmuch as the wet-proofing layer forming the exterior of the catalyst structure is no thicker than 2.0 milligrams per square centimeter, the oxygen and hydrogen diffuse through the wet-proofing layer into contact with the catalyst. Upon combination of the oxygen and hydrogen to form water, the liquid is kept from wetting the catalyst because of the critical surface tension of the material which is employed as the wet-proofing layer and which may be employed as the catalyst binder. The water formed by recombination is free to drain back into the aqueous electrolyte which covers the plates. In the event the cell is overdischarged, oxygen and hydrogen is evolved in the same manner as during overcharge except that the oxygen is generated at the negative plate and the hydrogen is generated at the positive plate.

If, alternately, it is desired to employ a catalyst structure with a nickel-cadmium cell having an excess negative plate capacity, the cell will continue to generate oxygen alone during overcharge as discussed above with reference to conventional nickel-cadmium cells. When the cell is overdischarged, however, hydrogen alone is generated. When the catalyst structure is incorporated in such a nickel-cadmium cell, the hydrogen formed during overdischarge is combined with the oxygen formed during overcharge. In such a cell overcharge and overdischarge may be cyclically repeated without over-pressurization of the cell.

As a further illustration of the operation of the cells constructed in accordance with the invention, the catalyst plenum shown in FIGURE 2 is connected to a plurality of lead-acid cells having equal positive and negative plate capacities. During normal cell operation, the half-cell reactions at the positive and negative plates, respectively, proceed as follows:

(+)  $PbSO_4 + 2H_2O \rightleftharpoons PbO_2 + H_2SO_4 + 2e + 2H^+$ $(-)$  $PbSO_4 + e \rightleftharpoons Pb + SO_4^=$ where the arrow to the right is direction of the reaction during charge and the arrow to the left is the direction of the reaction during discharge. Upon overcharge, however, oxygen and hydrogen are generated at the positive and negative plates, respectively, according to the following reactions:

$(+)$  $2H_2O \rightarrow 4H^+ + O_2 + 4e$
$(-)$  $4H^+ + 4e \rightarrow 2H_2$

The hydrogen and oxygen are quickly recombined by contact with the catalyst structures 32 mounted in the plenum 48. Oxygen and hydrogen are similarly formed upon overdischarge except that the oxygen is generated at the negative cell plates and the hydrogen is generated at the positive plates.

The following examples are illustrative of the practice of the invention and are not for purposes of limitation:

Example 1

A catalyst structure is prepared by forming a mixture of 10 grams Grade B carbonyl nickel powder, 2 grams platinum black, 2 grams palladium black, and 3.5 milliliters of a PTFE emulsion containing PTFE and distilled water in a ratio of from 1:10. Sufficient additional distilled water is added to form a workable slurry. The slurry is mixed thoroughly.

A 40-mesh nickel screen is cut 4 inches on a side (16 in.$^2$) and rolled flat. The screen is etched for 10 seconds in a bath consisting of an equipart mixture of 81 percent nitric acid and glacial acetic acid.

The slurry is applied uniformly to the screen using a roller. The resulting structure is air dried and is subsequently dried at 115° C. overnight (approximately 16 hours). Following drying, the structure is sintered at 250° C. for approximately 4 hours.

A wet-proofing layer is formed by spraying an aqueous dispersion of PTFE onto a sheet of aluminum foil and air drying. The thickness of the PTFE is controlled so that weight of PTFE on the aluminum foil after drying falls between 1.0 and 1.6 mg./cm.$^2$. The PTFE layer is applied to one side of the nickel screen at a temperature of 350° C. and a pressure of 1500 p.s.i. The aluminum foil is removed from the catalyst structure by dissolving in a dilute solution of potassium hydroxide.

Example 2

The procedure of Example 1 is repeated except that a layer of PTFE is applied to both sides of the nickel screen.

Example 3

A conventional nickel-cadmium cell including a vent tube, 4 negative, and 5 positive plates is provided as a control. The plates are each 1.6 in. x 2.8 in. in surface dimension. The control cell is designated cell 1.

Two cells identical to cell 1 are each modified by the mounting in the upper portion of the cell and projecting into the electrolyte chamber of a catalyst structure formed by the procedure of Example 1 and having an exposed surface area measured on one side of 1 in.$^2$. The cells are designated cells 2 and 3.

An additional cell identical to cell 1 is modified by the mounting in the upper portion of the cell and projecting into the electrolyte chamber of a catalyst structure formed by the procedure of Example 2 and having an exposed surface area measured on one side of 1 in.$^2$. The cell is additionally modified by the inclusion of baffles on either side of the catalyst structure similar in configuration to baffles 44 in FIGURE 1. The cell is designated cell 4.

Another cell identical to cell 1 is modified by placing in the cell and with one end resting on the upper edge of the plates a 10 mm. O.D. "Pyrex" glass tube having mounted therein and conforming to the inside surface a catalyst structure formed by the procedure of Example 2 and having a surface area as measured on one side of ½ in.$^2$. The cell is designated cell 5.

Two conventional nickel-cadmium cells each having 4 negative and 5 positive plates are provided. The plates are each 2.1 in. x 1.6 in. in surface dimension. The cells are modified by mounting a vent tube at the upper end of the cell casings whereby a connection may be made to other conduits. The cells are designated cells 6 and 7.

A lead-acid cell having 3 negative and 2 positive plates 2.5 in. x 2.5 in. in surface dimension is provided. The cell is provided with a catalyst structure similar to that of cells 2 and 3, and the cell is further modified by the mounting of a vent tube communicating with the upper portion of the electrolyte chamber. The cell is designated cell 8.

Cells 1 to 5 inclusive and 8 are potted in an epoxy resin such that the resin forms a casing of approximately ½ in. thickness on all sides of the cell casings. Cells 6 and 7 are mounted between steel plates. This procedure is followed to prevent bulging or rupture of the cell casings due to over-pressurization during test.

Example 4

The vent tube of each of cells 2 and 3 is connected to a Bourdon pressure gage. Each cell is overdischarged at a rate of 1 ampere. At the end of approximately 5 hours of overdischarge, a pressure of over 20 p.s.i.g. is noted, indicating over-pressurization of the cell. Inasmuch as the catalyst structure within each cell is inactivated by wetting, the cells are for purposes of further tests considered as controls, i.e., as having no catalyst structure mounted in the electrolyte chamber.

Example 5

The vent tube of cell 8 is connected to a Bourdon pressure gage. The cell is overdischarged at a rate of 1.5 amperes. At the end of approximately 0.4 hour of overdischarge a pressure of over 20 p.s.i.g. is noted, indicating over-pressurization.

Example 6

The vent tube of cell 4 is connected to a Bourdon pressure gage. The cell is noted to reach an equilibrium pressure of 1.5 p.s.i.g. at 1 ampere overdischarge. At 2.5 amperes overdischarge, the equilibrium pressure is 3 p.s.i.g. At 4.5 amperes overdischarge, no equilibrium is attainable, but the pressure is noted to decline rapidly as overdischarge is interrupted.

Example 7

The vent tube of cell 5 is connected to a Bourdon pressure gage. The cell is subjected to overcharging at 5 amperes from 2 to 5 times a day over a period of 5 days. The period of overdischarge in each instance is between 30 minutes and 1 hour. In all tests, the pressure rise is less than 0.1 p.s.i.g. and hence negligible.

Example 8

Cell 1 is tested by connecting the vent tube through a T to a valved catalyst plenum and a Bourdon pressure gage. The catalyst plenum is a chamber containing a catalyst structure formed by the procedure of Example 1 and having an exposed surface area measured on one side of 1 in.$^2$.

The valve leading to the catalyst plenum is closed and the cell subjected to an overdischarge of 1 ampere. A pressure of 20 p.s.i.g. is noted to be generated within 15 minutes.

Next, the valve to the catalyst plenum is opened and the cell is similarly subjected to an overdischarge of 1 ampere. No measurable amount of pressure rise is noted.

The same procedure is employed with similar results using cells 2, 3, 6, 7, and 8.

The tests results obtained by Examples 4 to 8 inclusive are summarized in Table I.

TABLE I

| Cell No. | Catalyst Type | Area Side, in.² | Catalyst Location | Over-current, amps | Pressure, p.s.i.g. | Time, hrs. |
|---|---|---|---|---|---|---|
| 2, 3 | Ex. 1 | 1 | Cell | 1.0 | >20.0 | 5.0 |
| 4 | Ex. 2 | 1 | ----do---- | 1.0 | 1.5 | (¹) |
| 4 | Ex. 2 | 1 | ----do---- | 2.5 | 3.0 | (¹) |
| 5 | Ex. 2 | ½ | ----do---- | 5.0 | <0.1 | 0.5–1.0 |
| 8 | Ex. 1 | 1 | ----do---- | 1.5 | >20.0 | 0.4 |
| 1, 6, 7, 2,² 3,² 8 ² | None | | | 1.0 | >20.0 | 0.25 |
| 1, 6, 7, 2,² 3,² 8 ² | Ex. 1 | 1 | Plenum | 1.0 | None | (¹) |

¹ Equilibrium.
² Tests run after inactivation of catalyst structure within cell.

By reference to Table I, it may be readily noted that conventional aqueous electrolyte secondary cells quickly build up high cell pressures when subject to an overcurrent without venting. The presence of a hydrogen-oxygen recombination catalyst having a wet-proofing layer on one of two exposed major surfaces lying within the electrolyte chamber is capable of retarding over-pressurization until the catalyst becomes wet. Subsequent to wetting, the catalyst is inactivated and pressurization proceeds as though no catalyst were present. When a catalyst structure having a wet-proofing layer on both major surfaces is mounted within an aqueous electrolyte secondary cell, it is capable of maintaining pressure well below 20 p.s.i.g. and, hence, eliminating over-pressurization. Finally, when a catalyst structure is mounted in a plenum remote from the cell electrolyte chamber but in communication therewith, the catalyst may be successful in eliminating over-pressurization even though only one major surface is provided with a wet-proofing layer.

While the invention is described with reference to certain specific embodiments and examples, numerous modifications and variations will be obvious to those having ordinary skill in the art. It is accordingly intended to include all such modifications and variations as may be embraced within the following claims.

What I claim as new and desire to secure by Letters Patent of the United States is:

1. An aqueous electrolyte secondary cell including
   spaced positive and negative plates,
   means encapsulating said positive and negative plates forming an electrolyte chamber,
   an aqueous electrolyte within said electrolyte chamber and contacting each of said positive and negative plates,
   a hydrogen-oxygen recombination catalyst in communication with said electrolyte chamber electrically insulated from each of said positive and negative plates and spaced from contact with said electrolyte, and
   a wet-proofing agent having a critical surface tension less than the surface tension of water forming an exterior layer covering said recombination catalyst.

2. A cell according to claim 1 in which said wet-proofing agent has a critical surface tension less than 32 dynes per centimeter.

3. A cell according to claim 1 additionally including at least one baffle interposed between said aqueous electrolyte and said recombination catalyst.

4. A cell according to claim 1 additionally including pressure responsive vent means mounted by said encapsulating means.

5. A cell according to claim 1 in which said recombination catalyst is mounted within said electrolyte chamber.

6. A cell according to claim 1 in which said recombination catalyst is mounted within a plenum remote from said electrolyte chamber.

7. An aqueous electrolyte secondary cell including
   spaced positive and negative plates,
   means encapsulating said positive and negative plates forming an electrolyte chamber,
   an aqueous electrolyte within said electrolyte chamber and contacting each of said positive and negative plates,
   a Group VIII metal having an atomic number in excess of 43 mounted within said electrolyte chamber, electrically insulated from each of said positive and negative plates and spaced from contact with said electrolyte, and
   a wet-proofing agent having a critical surface tension less than 32 dynes per centimeter forming a layer of from 0.7 to 2.0 milligrams per square centimeter substantially covering said Group VIII metal within said chamber.

8. A cell according to claim 7 in which said wet-proofing agent is polytetrafluoroethylene.

9. A cell according to claim 7 in which said Group VIII metal is employed in finely particulate form.

10. A cell according to claim 9 in which said Group VIII metal is in the form of a black and is intimately mixed with from 5 to 25 percent by weight, based on the weight of the mixture, of a binder.

11. A cell according to claim 10 in which said binder is polytetrafluoroethylene.

12. A cell according to claim 9 in which said Group VIII metal is supported on a noncorrosive substrate.

13. A catalyst plenum including
    means forming a catalyst chamber,
    means connecting said catalyst chamber to at least one aqueous electrolyte secondary cell,
    a catalyst structure within said catalyst chamber comprising
      a Group VIII metal having an atomic number in excess of 43, and
      a wet-proofing agent having a critical surface tension less than the surface tension of water forming an exterior layer on said Group VIII metal.

14. A plenum according to claim 13 in which said Group VIII metal is employed in finely particulate form.

15. A plenum according to claim 14 in which said Group VIII metal is in the form of a black and is intimately mixed with from 5 to 25 percent by weight, based on the weight of the mixture, of a binder.

16. A plenum according to claim 15 in which said binder is polytetrafluoroethylene.

17. A plenum according to claim 14 in which said Group VIII metal is supported on a noncorrosive substrate.

References Cited

UNITED STATES PATENTS

| | | | |
|---|---|---|---|
| 1,182,759 | 5/1916 | Emanuel | 136—86 |
| 2,578,027 | 12/1951 | Tichenor | 136—6 X |
| 2,857,447 | 10/1958 | Lindstrom | 136—28 X |
| 3,097,974 | 7/1963 | McEvoy et al. | 136—86 X |
| 3,207,631 | 9/1965 | Zaromb | 136—6 X |
| 3,258,360 | 6/1966 | Kordesch | 136—6 |

ALLEN B. CURTIS, *Primary Examiner.*

WINSTON A. DOUGLAS, *Examiner.*

B. J. OHLENDORF, A. SKAPARS,

*Assistant Examiners.*